United States Patent Office 2,773,111
Patented Dec. 4, 1956

2,773,111
METHOD AND APPARATUS FOR MANUFACTURING GLASS

Pierre Arbeit, Paris, and André Mathey, St. Romain le Puy, France, assignors to Societe Anonyme des Manufactures des Glaces et Produits Chimiques de Saint-Gobain, Chauny & Cirey, Paris, France Application July 1, 1952, Serial No. 296,552

Claims priority, application France January 23, 1948

13 Claims. (Cl. 13—6)

The present invention relates to an improvement in glass fining, especially in furnaces for continuous production.

As is known, the purpose of fining is to eliminate gas occurring in the glass by occlusion of absorption of air or by the reactions of the raw materials used for producing it. Usually, to eliminate the gas, the molten glass resulting from the melting of raw materials is heated to a temperature facilitating the formation of bubbles, which ascend until they reach the free level of the bath, where they burst immediately. The said temperature is about 1,450° C., it is limited to a zone of the furnace called the fining zone, and fining is the name of that part of glassmaking at which the glass is brought to a temperature which is about 1,450° C. and bubbles are released.

In the method used until now for freeing the glass from such occluded or generated gases, the bath surface was brought to fining temperature and the bubbles burst as a result of the decrease of the viscosity of the bubble pellicle and of the pressure rise of the gas therein contained; thus the upper level of the bath was constituted by a surface which was free from persisting foam and often smooth, those conditions being considered as favorable for a good fining.

In order that the invention may be readily understood, a brief review of glass-making and of certain fundamental terms employed in glass making will be given.

Glass is made from solid raw materials, usually a mixture of ingredients, called "batch." The batch, in continuous process, is put in at one end of a long, covered tank, fine glass being withdrawn from the opposite end. As it passes along the tank, the glass is subjected to different degrees of heat. In the part of the furnace where the solid batch floats, called the melting zone, the temperature is only high enough to efficiently melt the batch, for instance 1,200° to 1,300° C. The glass which issues from the melting zone is crude, impure and filled with gas; the process by which it is made into finished glass of high quality, is called "fining" and requires an increase of temperature up to about 1,450° C. One of the main objects of fining is to expel the gas from the glass and this expulsion begins at 1,300° C. but would last too long at this temperature. The glass is much too fluid to be satisfactorily worked, made into objects, at fining temperature and it contains tiny bubbles which are not discharged, but which are reabsorbed into the glass when the glass is cooled to a lower temperature. Consequently, a third stage of glass-making is working or conditioning and this occurs in a working zone which is kept at a temperature ideal for making objects.

The classical method of heating furnaces is to blow flame upon the surface of the glass from the sides of the furnace above the glass level, the penetration of heat into the glass being from the surface downward. The hottest glass is thus at the surface.

Another method of heating is by means of submerged electrodes which pass current between them through the glass.

In glass furnaces which are made of refractory brick, the loss of heat, particularly through the dome or vault of the furnace has been very great and constitutes a major source of heat and economic loss. This heat loss has been especially heavy over the fining zone where the fining temperature is highest and the temperature differential between the inside and outside consequently greatest. This resulted in the building of vaults of increasing thickness to reduce the losses and to rather futile attempts at insulation by capping the vault with known insulating materials.

It is an object of this invention to fine glass by raising its temperature to that required for the fining operation by internal heating of the glass bath and to reduce the heat losses during said fining operation.

Another object of the invention is to insulate the glass in the fining zone of a furnace against heat losses through the atmosphere above the glass bath, but without preventing the escape of occluded gases from the glass.

Another object is to confine heat generated internally in the glass bath of the fining zone of a glass furnace to the glass and to prevent that heat from being discharged into the atmosphere above the glass, thus increasing the thermal efficiency of the glass furnace.

The objects of the invention are accomplished, surprisingly, on the one hand by maintaining the atmosphere above the glass bath in the fining zone, at a temperature sufficiently low for lowering the temperature of the upper surface of the glass in the fining zone to a temperature at which the gases, discharged by the fining, congeal in bubbles on the surface and form a persisting layer of foam extending substantially throughout the upper surface of the fining zone, and on the other hand by creating a small, localized area or areas of intenser heat within the glass in the fining zone which will generate large, very hot bubbles which have sufficient ascentional force to break their way through the bubble blanket floating on the glass, thus providing for the escape of gases at localized spots and preventing any undesired accretion to the bubble blanket. The foam blanket may be maintained at efficient insulating thickness by raising or lowering the temperature above the foam layer if required.

According to the present invention, the fining of the glass in the furnace is carried out by means of heat applied to the interior of the glass in the fining zone, preferably by Joule effect generated by electrodes which pass current through the glass and are localized in the depth of the bath, and preferably, during the general operation of the furnace, by vertically arranged electrodes, preferably of rod type, which are submerged in the glass, and enter through the bottom of the furnace. Other types of electrodes may be used and other heating means such as submerged flame tubes or resistors, provided that they be constructed and arranged to deliver their heat in the localities desired and with selected intensity. At the same time, a thick and permanent foam layer is provided by maintaining the atmosphere above the fining zone at a temperature which is lower than the temperature at the surface of the bath and low enough to prevent the bursting of the bubbles that constitute the upper stratum of that foam layer. The invention also contemplates that the presence of the foam layer shall not prevent the evolution of bubbles formed in the glass and rising to the surface, but that such small bubbles may be gathered under the foam layer, in the hot spots, until they form big bubbles having sufficient force to break their way through the foam layer and escape.

We have ascertained that a persisting foam layer of adequate thickness floating on the bath surface constitutes a heat-insulating screen that permits the glass bath to be economically raised to and maintained at fining temperature by means of an internal source of heat, being brought to the temperature suitable for properly freeing the glass from bubbles, with a small energy cost.

According to the invention, the vault or dome of the furnace above the fining zone is made thin, to provide for the rapid escape of heat from the atmosphere above the glass. This principle is contrary to the practices of the prior art where every effort was made to prevent the escape of heat through the dome. In this way, the temperature of the atmosphere in the fining zone is lowered until the glass at the upper surface becomes stiff enough to resist breakage when bubbles are formed. The pellicles of the bubbles thus become strong enough to resist disruption and instead of bursting, they accumulate as a blanket of foam on the surface of the glass. The insulating value of this foam is greater than that of solid glass and as it grows deeper and deeper, less and less heat escapes from the glass bath and less and less energy may be used to maintain the bath at fining temperature. However, it is a waste of glass to allow the foam to become too thick and it is inconsistent with good operation of a furnace to allow the foam to fill the vault. Therefore, it is a part of the invention to control the thickness of a foam blanket and to this end other concepts of the invention contribute.

The first of these concepts of control involves the employment of heat above the layer of foam when it is desired to decrease its thickness, and the increased cooling and stiffening of the surface of the foam layer when it is desired to increase its thickness.

The second of these concepts of control is to locate in the bath of glass one or several sources of heat more intense than that existing elsewhere throughout the fining zone, from which bubbles ascend and transmit a higher degree of heat to a spot of the foam blanket, which is thus increased in temperature and weakened in strength so that as the bubbles gather at the weakened spot, they form larger bubbles and the larger bubbles eventually break through the foam layer and escape without adding to it.

The foam layer is thus induced by heat loss through a thin furnace crown, and controlled in thickness by controlling the temperature of the upper surface of the foam layer.

After it is formed, the foam layer should not be permitted to become too thick, as would happen if the temperature of the tank atmosphere above the foam becomes too cold. We ascertained that it may be advantageous to provide above the foam layer means for increasing, if necessary, the temperature of the tank atmosphere so as to decrease the thickness of the foam layer.

We also ascertained that, in case the layer becomes comparatively thick, a satisfactory evolvement of the bubbles is nevertheless obtained by creating in the bath hotter zones produced by the heat sources and in the vertical alignment of which the formed small bubbles have a tendency to gather into big bubbles which, by their ascensional force, break their way through the foam layer which is more fragile at that place by reason of the higher temperature.

To facilitate the formation of the foam layer, and to produce it quickly at any stage of the process, for instance, at the beginning of the operation while the furnace is being filled with glass, or when fining is just beginning, or when the foam has been temporarily dissipated or materially reduced in thickness for some purpose of the furnace man, the foam blanket may again be established in a comparatively short time by utilizing in the fining zone any of the known processes for generating foam, for instance a batch containing more than .5% sodium sulphate and about 2% alumina gives good results and an adequate production of foam. Furthermore, foam may be generated by admitting gases to the glass, or by adding to the glass certain materials known to the prior art which tend to product foam by decomposition or otherwise. Such methods of producing a more abundant supply of foam temporarily are an incident in but not essential to the invention.

The tank will be constructed in such a way that foam will not be able to spread to the working compartment from which the finished glass is extracted; to that effect, there may be provided dams which are higher than the upper level of the foam and which will not permit the communication of the zone covered with foam with the extractions zone except by passages situated beneath the level of the liquid glass.

In some modern furnaces ni addition to the fining and working zones, a conditioning zone is provided in which the glass is allowed to become quiet as the last bubbles disappear and the glass is homogenized. When that conditioning zone is distinct from the working zone, the bubble layer may be allowed to cover it as well as the fining zone.

In the accompanying drawing, there is illustrated a preferred embodiment of the invention:

Figure 2:
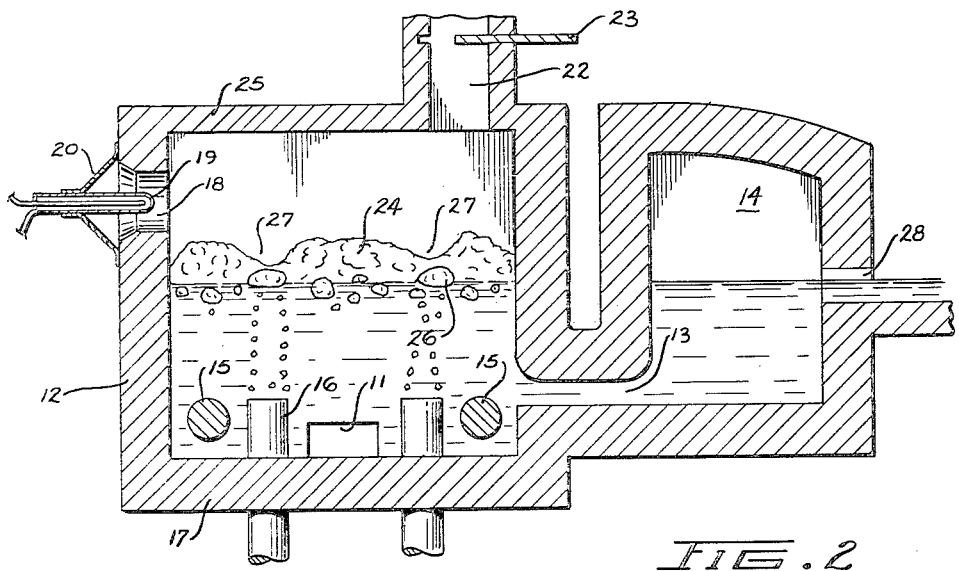
Fig. 2 is a vertical section on the line 2—2 of Fig. 1.
Figure 1:
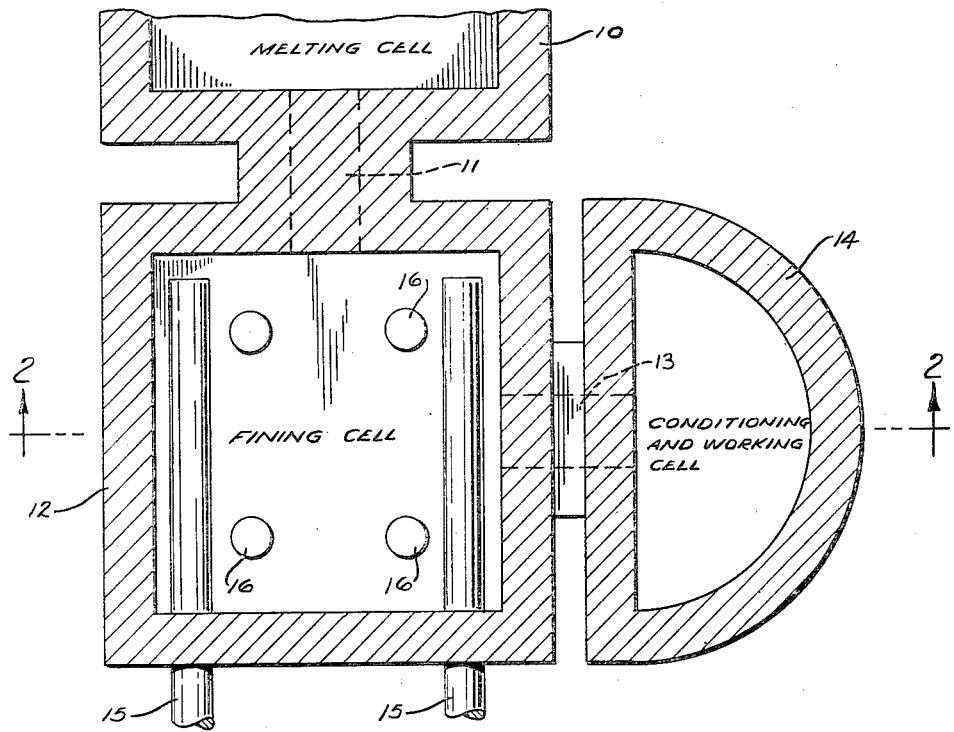
Fig. 1 is a horizontal section through a glass furnace constructed in accordance with the principles of the invention.

The furnace illustrated has a melting compartment 10 which is isolated from the fining compartment 12 except for a throat 11 which connects the two compartments at the bottom. This compartment is heated by any known means, for instance, by flame, no heating means being illustrated as the invention is not dependent upon the type of heat employed in the melting zone. In this case, the melting zone is in a chamber separated from the fining zone, but in other constructions a single tank may include both zones, the isolation of the zones being accomplished by baffles extending upward from the glass level, if desired.

Glass is melted in the compartment 10 and flows through the throat 11 into the fining cell 12 which is shown as a rectangular tank connected at one side by a throat 13 to the conditioning and working compartment 14.

The construction of the walls of the melting compartment is normal, the walls being in accordance with the best practices of the prior art and consequently of a normal and material degree of thickness. The walls of standard glass furnaces have a thickness of 25 cm. to 30 cm. and such may be employed in this melting compartment, the wall thickness of which in no ways differs from standard good practice. The side walls of the fining cell are also of normal type and thickness, but the thickness of the dome or vault 25, which is above the glass, is materially reduced in order to provide for a materially increased discharge of heat to the atmosphere above the glass and consequently for a cooling of the upper surface.

In the form of the invention illustrated, the vault had a thickness ½ the thickness of the wall in contrast to the normal proportion of 1–1. In terms of temperature, it is desirable to maintain the temperature between the dome and the upper surface of the glass on the order of 1,000 to 1,100° C., and this may be accomplished roughly by constructing the fining zone with a dome which is a fraction of the thickness employed in normal good practice.

The heat transferring characteristics of furnaces differ in different localities according to the materials employed in their construction and the characteristics of their heating means so that, for accurate control of the temperature under the vault, and for control of and changing the thickness of the blanket of foam, 24 in the drawing, it is advisable to supply the fining cell with a port 18 above the level of the layer of foam through which air from the furnace room can be admitted to the dome through a damper 20 which can be completely closed to exclude all air or opened to admit it. The damper is schematically illustrated in Fig. 2. The damper 20 is conical in shape and an oil burner nozzle 19 is directed into the port 18 and above the layer of foam through the apex of the cone. Thus provision is made for heating the space above the foam and for controlling the thickness thereof.

A chimney 22 extends upward from the dome of the fining zone and this chimney is provided with a damper 23. The chimney and the damper 23, in combination with the burner 19 and the damper 20 provide for complete control of the temperature under the vault. In general, it is not necessary in this arrangmeent for the furnace operator to measure the temperature in the furnace, because once he has established a foam blanket of satisfactory thickness, for instance 10 to 25 cm. thick, he can maintain that thickness by increasing the temperature beneath the dome and above the foam by the burner 19 if he wishes to reduce the thickness of the blanket of foam, and by cooling that space by turning off the burner 19 and opening the damper 20 if he wishes to increase that thickness. Once a satisfactory layer has been established, the cell is substantially self operating to maintain the blanket at the same thickness.

In order to fine the glass, the cell is provided with horizontal electrodes 15 which enter through the side wall toward the bottom of the cell and by vertical electrodes 16 which also are admitted vertically through the bottom of the furnace. During the start of the campaign of the cell, enough molten glass is poured into the cell to cover the horizontal electrodes, which are then energized, fine the glass by Joule effect, passing alternating current through the glass from electrode to electrode and form the foam blanket. During this stage the vertical electrodes are withdrawn so as also to be covered. When the glass has reached the level indicated in Fig. 2, this is, the running level of the furnace, the electrodes 15 may be turned off and the entire heating carried on by means of vertical rod type electrodes 16 which perform the function not only of fining the glass, but creating localized hot points in the cell which contribute to its correct operation and the accomplishment of the invention. These electrodes are preferably localized in the lower part of the bath. As the fining of the glass proceeds, bubbles are released on and in the immediate vicinity of the electrodes surface and these bubbles proceed upward until they reach the surface where they gradually coalesce forming large bubbles 26 which are sufficiently hot, hotter than the neighboring bubbles in the bubble blanket, increase the temperature of the glass at points 27 above the electrodes, reducing its tenacity at those points so that the large bubbles eventually make their way through the layer of foam, and burst and release their gas which escapes through chimney 22. Thus, although bubbles are being continually discharged from the glass as the fining proceeds, those bubbles do not increase the thickness of the foam layer. However, if it is desired to increase the thickness of the foam layer, the upper surface of the foam is chilled by the admission of cold air through damper 20, becoming stiffer and preventing the escape of the bubbles which contribute to the thickness of the blanket until the damper is closed and the operating system reestablished. If it is desired to reduce the thickness of the blanket, this is accomplished by the operation of the burner 19. It may be advantageous to that end to place the burner in the vertical alignment of a vertical electrode. Ordinary fining power densities are adequate with the vertical electrodes to provide the hot escape spots.

The working cell 14 receives fined glass from fining cell 12 through throat 13 which is above the level of the bottom of the fining cell and at the level of the bottom of the working cell. In the latter cell, the conditioning of the glass occurs and when it has been brought to conditions of quietude and temperature satisfactory for working, it is withdrawn through the orifice 28 to machines or otherwise as the case may be.

According to the present invention, there is established voluntarily on the surface of the bath in the fining zone a thick layer of persisting foam extending substantially over the whole surface of the zone and which, for maximum efficiency should be on the order of 10–25 cm. in thickness. The bubbles which constitute this blanket are generally on the order of several millimeters in diameter. The blanket is obtained by internally heating the bath to fining temperature, while cooling the space above the bath to a temperature lower than that of the bath. The temperature thus maintained above the bath being low enough to strengthen the glass pellicles of the bubbles sufficiently in the upper stratum of the foam blanket, so that they do not tend to burst. If the temperature above the foam blanket in the fining zone is maintained at 1,000 to 1,100° C. it will achieve this result. The internal heating of the bath is preferably accomplished by means of electrodes penetrating through the bottom and situated in the depths of the bath and which establish in their immediate vicinity locallized zones of concentrated energy which are hotter than the rest of the bath. Under these circumstances, the bubbles which form in the hot zones near the bottom, do not increase in diameter as they go toward the surface because they encounter toward the surface layers of glass which are cooler. The small bubbles which reach the surface do not individually have sufficient ascentional force to break through the bubble blanket but they unite under the blanket at points above the hot zones and form large bubbles which are capable of disrupting the layer and which from time to time break through the blanket and burst. This is due to the fact that the spots above the hot zones are hotter because currents of hot glass arise from the electrodes and weaken the glass in the bubble blanket above those spots.

In order to produce the bubble blanket originally, it is advantageous to use only the horizontal electrodes to heat the depths of the bath. The thickness of the foam blanket can be regulated at will by the damper and heating means provided, as many of which can be used as desired in a particular furnace. When the layer of foam has been formed to the desired thickness, the horizontal electrodes are preferably turned off and only the vertical electrodes are used.

An advantage of the invention is that the layer of foam, thick and formed of fine bubbles, constitutes a thermal screen of great value and high efficiency which reduces the dissipation of heat through the vault of the furnace. The thickness of the layer is under control and never becomes harmful to the process as it would if allowed to increase continually.

As many apparently widely different embodiments of the present invention may be made without departing from the spirit and scope thereof, it is to be understood that the invention is not limited to the specific embodiments.

This is a continuation in part of my application Serial No. 70,605, filed January 12, 1949, and which has become abandoned.

What is claimed is:

1. A method for glass fining which consists in melting raw materials to make crude glass, internally heating said crude glass to fining temperature, forming and maintaining an insulating layer of glass foam about 10 to 25 cm. thick covering the surface of said crude glass, heating a localized part of said crude glass internally to a temperature higher than the surrounding glass and thus generating hotter and bigger bubbles capable of forcing their way through the foam layer, and controlling the thickness of said foam layer by controlling its temperature.

2. The method of making glass that comprises melting glass raw materials containing more than .5% sodium sulfate and about 2% alumina, to form crude glass, raising the melted glass by internal heating to fining temperature accompanied by bubble formation, cooling the bubbles as they reach the surface to a temperature at which they persist and form a permanent foam layer, and continuing the fining beneath the layer of foam.

3. The method of insulating the fining zone of a glass furnace equipped in the fining zone with a submerged, vertically arranged, heating electrode that comprises cooling the atmosphere above the glass surface of the fining zone to a temperature at which the bubbles escaping from the glass stiffen before they break and remain upon the glass as a layer of glass foam of insulating thickness extending over the whole surface of the fining zone, passing the glass in a moving stream beneath the bubble layer, heating the glass internally in the fining zone to fining temperature beneath the bubble layer, and maintaining the bubble layer as a blanket of insulating thickness above the moving glass by controlling the temperature of the contiguous furnace atmosphere.

4. The method of fining glass in a glass furnace that comprises maintaining above the glass undergoing fining beneath the crown of the furnace a temperature circa 1000–1100° C. whereby to form a persisting bubble blanket, and fining the glass beneath the blanket by Joule effect.

5. A furnace for making glass having a thin, heat dissipating crown above the fining zone, a set of horizontal electrodes beneath the operating glass level, and a set of upright electrodes beneath the operating glass level, both sets being in the fining zone.

6. A glass making furnace having a separate fining cell connected to the melting and working parts of the furnace by orifices near the bottom, means to cool the space beneath the crown of the cell, means to heat the space beneath the crown of the cell, fining means comprising vertical electrodes submerged in the glass, and means to supply to the vertical electrodes power of fining intensity.

7. A glass making furnace having a separate fining cell connected to the melting and working parts of the furnace by orifices near the bottom, means to cool the space beneath the crown of the cell, means to heat the space beneath the crown of the cell, fining means comprising sets of vertical and horizontal electrodes beneath the glass level of the furnace, and means to energize the said sets individually with power of fining intensity.

8. A process of fining glass in a fining zone which comprises forming over the whole surface of the molten glass in the fining zone a thick and persistent foam layer by generating in the lower levels of the glass in the fining zone a fining temperature sufficiently high to deliver bubbles to the surface of the molten glass, stiffening the bubbles into such foam layer by maintaining the atmosphere above and contiguous to the foam at a temperature lower than that of said bath and below that at which the bubbles in the upper portion of the foam layer tend to burst, heating a localized place in the molten glass beneath the foam layer in the said fining zone to a fining temperature higher than that in the adjacent portions of the said zone, and sufficiently high to deliver underneath the foam and immediately above said localized place bubbles which coalesce, form larger bubbles, and at certain time-intervals pass through and escape from the foam layer.

9. The method of insulating the fining zone of a glass furnace equipped in the fining zone with a vertically arranged heating electrode submerged in the lower levels of the glass that comprises cooling the atmosphere above the glass surface of the fining zone to a temperature at which the bubbles escaping from the glass as a result of fining stiffen before they break and remain upon the glass as a persistent layer of glass foam of insulating thickness extending over the whole surface of the fining zone, passing the glass in a moving stream beneath the bubble layer, heating the lower part of the glass bath beneath the foam layer internally to fining temperature, and maintaining said foam layer as a blanket of insulating thickness above the moving glass by energizing said electrode sufficiently to raise the temperature above it to a degree sufficient to form large bubbles capable of escaping through the said foam layer.

10. A method for fining crude glass by a continuous process which comprises flowing crude glass into fined glass in a fining cell and flowing fined glass out of said fining cell, heating the lower part of the glass in the cell by internal heating, to fining temperature with bubble release, cooling such bubbles as they reach the surface of the molten glass until a substantially non-bursting bubble layer is formed on the glass, maintaining the temperature of the upper layers of such bubbles below that at which they tend to burst until the foam layer becomes of insulating thickness, and controlling the temperature of the atmosphere contiguous to said layer as needed to regulate the thickness of said layer.

11. A method for glass fining which consists in melting raw materials to make crude glass, internally heating the lower part of said crude glass to the temperature of fining with release of bubbles, forming and maintaining an insulating layer of glass foam over the whole surface of said crude glass by congealing the said bubbles on the surface thereof, heating a localized part of the lower part of said crude glass internally to a temperature higher than the surrounding glass and thus generating hotter and bigger bubbles capable of forcing their way through the foam layer, and controlling the thickness of said foam layer by controlling the temperature of the atmosphere above it in a range about 1000–1100° C.

12. The process of claim 8 in which the temperature of the atmosphere contiguous to the glass foam is kept at circa 1000° C.-1100° C.

13. The process of claim 9 in which the foam layer is circa 10–25 cm. thick.

References Cited in the file of this patent

UNITED STATES PATENTS

| 1,062,362 | Sauvageon | May 20, 1913 |
| 1,631,204 | Hitchcock | June 7, 1927 |
| 1,880,541 | Wadman | Oct. 4, 1932 |
| 2,122,469 | Hitner | July 5, 1938 |
| 2,123,536 | Long | July 12, 1938 |
| 2,228,347 | Drake | Jan. 14, 1941 |
| 2,254,079 | McAlpine | Aug. 26, 1941 |
| 2,261,022 | Fox et al. | Oct. 28, 1941 |
| 2,263,549 | Peyches | Nov. 18, 1941 |
| 2,293,948 | Peyches | Aug. 25, 1942 |
| 2,417,913 | Cornelius | Mar. 25, 1947 |
| 2,635,388 | Peyches et al. | Apr. 21, 1953 |
| 2,636,913 | Lambert | Apr. 28, 1953 |

FOREIGN PATENTS

| 597,838 | Great Britain | Feb. 4, 1948 |
| 629,811 | Great Britain | Sept. 28, 1949 |
| 921,568 | France | Jan. 13, 1947 |